Patented July 14, 1925.

Re. 16,116

UNITED STATES PATENT OFFICE.

EGBERT CORNELIS SUTHERLAND, OF DEVENTER, NETHERLANDS, ASSIGNOR TO NAAMLOOZE VENNOOTSCHAP, INDUSTRIEELE MAATSCHAPPIJ VOORHEEN NOURY & VAN DER LANDE, OF DEVENTER, NETHERLANDS, A CORPORATION OF NETHERLANDS.

PROCESS FOR TREATING MEAL OR FLOUR AND MILLING PRODUCTS.

No Drawing. Original No. 1,380,334, dated May 31, 1921, Serial No. 136,551, filed December 12, 1916. Application for reissue filed March 29, 1922. Serial No. 547,909.

*To all whom it may concern:*

Be it known that I, EGBERT CORNELIS SUTHERLAND, chemist, residing at Deventer, The Netherlands, have invented certain new and useful Improvements in and Relating to a Process for Treating Meal or Flour and Milling Products, of which the following is a specification.

My invention relates to a process for treating meal or flour and milling products made from any starting material and has for its object to improve the color, the baking qualities and the durability of these products.

By improvement in the "baking qualities" the property is meant that dough prepared from flour treated in this way swells stronger than dough made from untreated flour and produces loaves which are proportionally larger, from the same amount of flour, or meal, such swelling being separate and distinct from the "rising" of raised bread, which latter is produced by the addition of bread raising agents (e. g. baking powder etc.).

The process may be applied to all kinds of meal or flour and milling products obtained from grain, as well as to all intermediate products. It may also be applied to meal from beans and tubers, which latter application has the important advantage that not only the color and the durability of such meals are improved, but that also the disagreeable odor and flavor, often inherent in such meals, fully disappear. This is, for instance, the case with meal from soya beans and from manioc roots.

Flour from grain is in the first place judged by its baking qualities and its color, its durability being moreover a very important feature.

Many efforts have been made to improve the baking qualities of meal and flour, however, without satisfactory results. From the methods proposed for improving the color of flour and milling products from grain, those in which dioxid of nitrogen is used, have proved to be practicable to a certain degree. It soon turned out however, that the improvement in color attained thereby was not very important, while it was difficult to control the process; the result being a too strong reaction of the nitrogen dioxid, by which reaction the meal assumed a brown color, so that in some respects the quality of the treated meal was poorer than that of the untreated. Besides it was supposed, rightly or wrongly, that the reaction of the nitrogen dioxid gave rise to the formation of poisonous or noxious substances in the meal and that its digestibility was rendered more difficult.

That is why in some places the processes in which nitrogen dioxid is used have fallen into disuse, and as matters stand at present the milling trade does not yet possess a useful and entirely satisfactory process for improving the quality of meal and flour as to its baking qualities, color and durability.

It has now been found by applicant that an improvement in the color of meal and flour, including inferior qualities thereof, together with preservation of the flour or meal, and an improvement of the baking qualities, are obtained by mixing the meal or flour with a peroxidized compound. The peroxidized compounds can be divided into two classes (a) a "true" inorganic or organic peroxid and (b) a peracid or persalt which is capable of producing a bleaching action on the flour, when used in amount chemically equivalent to 0.02% of hydrogen peroxid. The meal or flour is thereafter subjected to a treatment by which the said peroxidized compound in the mixture is decomposed with the liberation of active oxygen, which latter reacts very energetically on the coloring substance of the meal, or flour, so that it assumes a bright and lively color. Besides the above mentioned results there is obtained another considerable technical effect, to wit, the increasing of the moisture absorbing qualities of the flour, the meal, or the milling products. Therefore, the bread yield from a given amount of any particular flour, is increased by this invention.

The expression "true peroxids" is intended to cover those inorganic peroxids which may be considered to be salts of hydrogen peroxid, and this compound itself, as well as organic peroxids. According to their nature the peroxids, as above described, may be added either as such, or in solution or suspension. I do not limit myself, either to special representatives of the groups of compounds mentioned, nor to a special form in which they are added to the meal or flour. It must further be understood that mixtures of said suitable peroxidized compounds are intended to be covered by my claims. I do not include, however, in what I claim, those inorganic peroxids like nitrogen peroxid, which cannot be considered to be salts or derivatives of hydrogen peroxid.

Only an exceedingly small quantity of the peroxidized compound is required to obtain satisfactory results. The quantity required (relatively to the quantity of meal or flour) may be varied according to the kind and the quality of the meal or flour to be treated. The treatment by which the peroxidized compound is decomposed may be of a physical or of a chemical nature. It may advantageously consist in a treatment with actinic rays, e. g. such as are emitted by a mercury vapor lamp. Moreover it is to be observed that the step of mixing the flour, meal, or milling product with the peroxidized compound, is itself a novel step in the art.

After the treatment according to my invention, the meal or flour is found to be very completely sterilized and is also found to have obtained a good durability, while a further advantage of the process is, that the meal, or flour, does not assume a bad odor and flavor when kept, in contradistinction to untreated meal or flour, which often assumes these properties before turning really bad, by the action of molds and bacteria.

The improvement of the baking qualities is certainly partly to be ascribed to the fact, that living micro-organisms, having an unfavorable influence on the fermentation, are no longer present in the treated meal or flour. On the other hand the stiffness and elasticity of the gluten are increased.

The process may be executed as follows:

Meal, e. g. mixed bolted meal—i. e. meal obtained by combining all the different kinds of products of the factory, the bran and the germs only excepted—obtained from a mixture of La Plata, Kansas, and Montana wheat (which mixture has already a rather light color) is mixed with 0.7% (by weight) of a 3% solution of hydrogen peroxid, i. e. with about 0.02% $H_2O_2$. This meal is transported by a belt-conveyer through a room in which mercury vapor lamps for 220 volts are placed. The thickness of the layer of meal on the belt may be about 3 cm., while the speed of the belt is regulated in such a way that 200 kg. of meal will pass thru the room per lamp and per hour.

No claim is made herein to any treatment of flour, or meal, or other milling products, with nitrogen oxids or with ozone. No claim is made herein to the use of such persalts as the percarbonates, perborates, perphosphates or persulfates, which decompose in a quite different manner, and which do not produce any bleaching of the flour or meal. This difference is included in the expression "which are capable of bleaching the flour or meal." This disclaimer is not intended to apply to true peroxides themselves as distinguished from peracids and persalts.

In my copending application 426,223, filed November 24, 1920, I have claimed the bleaching and improvement of flour by the addition of organic peroxids, and also an intermediate product comprising a cereal milling product mixed with a peroxid compound, such subject matter being referred to in the present case, but not specifically claimed herein.

I claim:

1. A process of treating flour, meal, and milling products, which comprises mixing the product with a reagent containing as its essential constituent, a peroxid compound, and decomposing said compound while mixed with said product, under conditions capable of producing active oxygen in contact therewith, and while maintaining substantially the normal consistency of said product.

2. A process of treating flour, meal, and milling products, which comprises mixing the product with a "true" peroxid, and decomposing this compound while mixed with said product, under conditions capable of producing active oxygen in contact therewith, and while maintaining substantially the normal consistency of said product.

3. A process of treating flour, meal and milling products, which comprises mixing the product with a "true" inorganic peroxid, and decomposing such peroxid while mixed with said product, under conditions capable of producing active oxygen in contact therewith, and while maintaining substantially the normal consistency of said product.

4. A process of treating flour, meal, and milling products which comprises mixing the product with an aqueous solution of a soluble "true" inorganic peroxid, in amount insufficient to wet said product, decomposing this peroxid while mixed with said product, under conditions capable of producing active oxygen in contact therewith, while maintaining the milling product otherwise in its normal physical condition.

5. A process of treating flour, meal, and milling products, which comprises mixing the said product with an aqueous solution of hydrogen peroxid, in amount insufficient to wet said product, and decomposing the hydrogen peroxid while mixed with said product, under conditions capable of producing active oxygen in contact therewith.

6. A process of treating flour, meal and milling products, consisting in mixing the product with a small proportion of a peroxidized compound, and decomposing this compound, with the liberation of nascent oxygen while maintaining said milling product in a pulverulent condition and at a temperature below that necessary to cook the same.

7. A process of treating flour, meal and milling products, which comprises mixing the product with a few hundredths of a per cent of a peroxid compound, and decomposing the peroxid compound, with the production of nascent oxygen, while leaving the said milling product in substantially its normal pulverulent condition.

8. A process of treating flour, meal and milling products, consisting in mixing the product with a few hundredths of a per cent of an inorganic peroxid which is capable of bleaching the said products, and decomposing the peroxid, with the production of free oxygen in a highly active state, in contact with the said product.

9. A process of treating flour, meal and milling products, which comprises mixing the product with an aqueous solution of a soluble "true" inorganic peroxid, in amount insufficient to wet the said product, and decomposing the peroxid, with the production of free oxygen in a highly active state, while maintaining said milling product in a pulverulent condition and at a temperature below that necessary to cook the same.

10. A process of treating flour, meal and milling products, which comprises mixing the said product with an aqueous solution of hydrogen peroxid, in amount insufficient to wet the said product, and decomposing the hydrogen peroxid, with the production of free oxygen in a highly active state, while maintaining said milling product in a pulverulent condition and at a temperature below that necessary to cook the same.

11. A process for treating flour, meal and milling products, consisting in mixing the product with a peroxidized compound, spreading out the mixture in the form of a layer upon a belt-conveyor and moving the belt-conveyer with the mixture through a room in which the mixture is exposed to actinic rays.

12. A process for treating flour, meal and milling products, consisting in mixing the product with a peroxidized compound, and subjecting the entire mixture to actinic light.

13. A process for treating flour, meal and milling products, consisting in mixing the product with a peroxidized compound and decomposing this compound, when in the mixture, by subjecting the same to actinic rays.

14. A process for treating flour, meal and milling products, consisting in mixing the product with a "true" inorganic peroxid and decomposing this peroxid, when in the mixture, by subjecting the same to actinic rays.

15. A process for treating flour, meal and milling products, consisting in mixing the product with an aqueous solution of hydrogen peroxid and decomposing the hydrogen peroxid, when in the mixture, by subjecting the same to actinic rays.

16. The process of treating milling products of the nature set forth, and similar material, which comprises bleaching the same by treatment with a powerful oxidizing agent in conjunction with the step of subjecting the same while in a pulverulent state to the action of a reaction-accelerating influence, whereby the nascent oxidizing effect is intensified, and the milling product is bleached by the nascent oxygen liberated.

17. The treatment of milling products while in a finely-divided state, with ultra-violet rays while in the presence of reactive oxidizing agents.

18. A process of treating flour, meal and other edible milling products having their normal starch content, which comprises mixing the same with a peroxid capable of bleaching such products, in amount corresponding to a percentage of available oxygen not substantially in excess over the quantity necessary to bleach the flour and to improve its baking qualities, so as to bleach and improve the milling products as such.

19. A process of treating flour, meal and other edible milling products having their normal starch content, which comprises mixing the same with a peroxid capable of bleaching such products, in amount corresponding to a percentage of available oxygen not substantially in excess over the quantity necessary to bleach the flour and to improve its baking qualities, and thereafter subjecting the mixture to conditions capable of liberating free oxygen in a highly active state.

20. A process of treating flour, meal and like edible milling products with a percentage of hydrogen peroxid not substantially greater than 0.02%.

21. A process of treating flour, meal and like edible milling products with a percentage of a peroxid of the class containing loosely combined oxygen which can be liberated as free oxygen in a highly active state and which is capable of bleaching the products, the amount of such peroxid containing not substantially more than 0.01% of such loosely combined oxygen.

22. A process of treating flour, meal and milling products with a peroxid of the hydrogen peroxid type which is capable of bleaching such products in amount not substantially greater than the chemical equivalent of 0.02% of hydrogen peroxid.

23. The step in the process of making bread which consists in incorporating with the flour which is to be used in a dough batch, and which has a normal starch content, a peroxid in such quantities as will increase the moisture capacity of the flour above the normal without breaking down the gluten in the flour, such peroxid being non-toxic to permit its use in a food product.

24. The steps in the process of making bread, which consist in incorporating with flour, having a substantial starch content, a peroxid in such quantities as will increase the moisture capacity of the dough batch above the normal, without breaking down the gluten in the flour, such peroxid being non-toxic to permit its use in a food product, and adding the other ingredients of a dough batch.

25. The step in the process of making bread which consists in incorporating with flour which is to be used in a dough batch, and which has a normal starch content, hydrogen peroxid in such quantities as will increase the moisture capacity of the flour above the normal without breaking down the gluten of the flour.

26. The steps in the process of making bread which consist in incorporating with the flour having a substantial starch content, hydrogen peroxide in such quantities as will increase the moisture capacity of the dough batch above the normal without breaking down the gluten of the flour, and adding the other ingredients of a dough batch.

27. The process of making bread which comprises incorporating with the flour to be used in the dough batch, a peroxid of the class including hydrogen peroxid and those peroxids which are derived therefrom, in amount corresponding to not more than a few hundredths of a per cent of hydrogen peroxid, whereby the amount of bread which can be produced from a given quantity of the flour is increased.

28. The step in the process of making bread, which consists in incorporating with the milling product to be used in the bread, a peroxid in such an amount as will improve the baking qualities of said milling product, but not greatly in excess of the quantity necessary to bleach said milling product, such peroxid being non-toxic to permit its use in making a food product.

29. The steps in the process of making bread, which consist in incorporating with the flour, a peroxid in such an amount as will increase the moisture capacity above the normal, the amount of such peroxid being not substantially greater than the equivalent of 0.02% $H_2O_2$ relative to the weight of the said flour, such peroxid being non-toxic to permit its use in a food product, and adding the other ingredients of a dough batch.

30. As a new material, an edible pulverulent milling product carrying admixed therewith, a proportion of a peroxidized compound which is capable of bleaching such product, corresponding to not substantially more thereof than is necessary to bleach such product and to improve its baking qualities.

31. As a new material, an edible meal, flour or like milling product in admixture with a "true" peroxid in proportion sufficient to improve the baking qualities, but containing an amount of active oxygen not substantially in excess of .01% relatively to the weight of said product.

32. As a new material of manufacture, an edible milling product carrying admixed therewith, a proportion of a "true" peroxid corresponding to not substantially more thereof than is necessary to bleach said product and to improve its baking qualities.

33. As a new material of manufacture, an edible milling product having a normal percentage of starch, and carrying admixed therewith, a proportion of a "true" peroxid corresponding to not substantially more thereof than is necessary to bleach said product and to improve its baking qualities, such peroxid being mixed with a liquid or aqueous vehicle.

In witness whereof, I have signed my name to this specification.

EGBERT CORNELIS SUTHERLAND.